United States Patent Office 3,180,715

Patented Apr. 27, 1965

3,180,715

MAGNETIC MEMORY DEVICE AND METHOD OF PRODUCING SAME

Joseph Simon, North Hollywood, Calif., assignor to General Precision, Inc., a corporation of Delaware No Drawing. Filed Nov. 9, 1962, Ser. No. 236,701
7 Claims. (Cl. 29—194)

This invention relates to magnetic memory devices and more particularly to magnetic memory devices for computers or the like and to the method of producing the same upon which discrete "bits" of information are "written" and "read" by means of "write" and "read" heads.

A conventional type of magnetic memory device consists of a disc, drum, or tape made of a suitable base material or substrate which is nonmagnetic, and a coating of a ferromagnetic iron oxide such as ferrite.

Ferrite coated articles of this character have certain disadvantages. For example, the iron oxide is applied in the form of a dispersion or a mixture with an organic vehicle which dries or cures to an adherent film when applied to the substrate. Conventional memory devices of this type are objectionable because the packing density of the magnetic bits cannot be controlled to a satisfactory degree, the packaging density is erratic, the magnetic domains are not uniform and the power input and output are high. Magnetic coatings utilizing an organic binder also have a tendency to flake-off in the form of "lint" or the like and to shoot out the "read" and "write" heads. This is particularly true when the drum or disc is rotated at high speeds. Also, if a "read" or "write" transducer head is brought into physical contact with a magnetic film of this character, it will cause destruction of the coating and usually of the drum.

Nevertheless, ferrite coated memory devices have been generally used heretofore, for lack of anything that is equal or better.

Magnetic metals such as nickel, iron, cobalt, etc. have been considered and tried, but coatings or layers of these metals on a suitable nonmagnetic substrate have not been completely satisfactory heretofore because of difficulties encountered in obtaining satisfactory adherence to the nonmagnetic undercoating, poor readout, high write current required and non-uniformity of the magnetic coating with a resultant unacceptable variance in readout signal.

It is an object of the present invention to overcome these objections and to provide a magnetic memory device which has superior magnetic read-write properties, is hard and adheres tenaciously to the substrate at all speeds.

Other objects of the invention will be apparent from the ensuing description and the appended claims.

By "memory device" as the term is used herein, is meant a device which has the following structure and properties:

(1) It has a substrate or main physical structure which is nonmagnetic, in a form which is adapted to traverse (or to be traversed by, i.e., to undergo relative movement to), a magnetic transducer such as a magnetic sensing head or a magnetic record head.

(2) The surface of the substrate (with or without an intervening layer of material) is coated uniformly with a magnetic material which can be magnetized by a magnetic record head to store therein discrete bits of information each of which can be read by a magnetic sensing head.

In accordance with the present invention, a memory device is prepared as follows: A suitable nonmagnetic substrate is chosen which is preferably aluminum (or an alloy of aluminum) in a suitable physical form such as a disc, a cylindrical drum or the like.

To this substrate is applied a thin coating of zinc. This may be accomplished by any standard procedure such as a zinc immersion coating procedure. Preferably a zincating procedure is employed.

Next, a thin layer of copper is applied to the zinc, preferably by electroplating means from a standard copper electroplating bath.

Then, a thing layer of cobalt is applied to the copper coating by electroless deposition, as from a standard electroless cobalt bath.

If cobalt is applied directly to aluminum it will exfoliate. If it is applied to copper alone, it does not have satisfactory magnetic properties and does not provide a superior magnetic memory device. We have discovered that if the substrate is coated with zinc and then with copper, and if the copper is then coated with cobalt by electroless deposition, a very superior memory device is provided.

It is believed that the undercoating of zinc and copper have fissures, pores or crevices and which expose the substrate, which provide centers or nuclei for the deposition of cobalt and cobalt phosphide as dendrites or filaments, and that the electroless coating or cobalt and/or cobalt phosphide is discontinuous (although on a microscopic scale and not on a gross scale), thereby giving rise to separate, discrete magnetic domains rather than to a magnetic continuum in which the magnetic flux impressed by a record head will diffuse with consequent poor resolution.

In any event, and as an empirical fact the coating procedure described above, that is to say, (1) a zinc coating on aluminum, (2) a copper coating on the zinc and (3) an electroless cobalt coating on the copper, results in a memory device which has extraordinary properties.

The following specific example will, serve further to illustrate the practice and advantages of the invention:

*Example 1*

A disc of aluminum alloy (6061–T6) having dimensions of 10.5″ dia. x ⅜″ thickness was employed. This disc was formed with holes to affix it to the turntable of a computer, and throughout the procedure herein described it was suspended by aluminum wire passing through certain of these holes and bent to a suitable shape. As a result of this procedure the wire was coated similarly to the disc. It was cleaned thoroughly by exposure to trichlorethylene vapor, and wiping with soft absorbent cotton saturated with acetone. The surface is preferably smooth and care is taken throughout to avoid scratching or marring the surface. The clean disc is then immersed in a commercial zincating solution, for example, a solution of "Alumon," which is the trademark of Enthone, Inc. Immersion in this solution is at room temperature for 60 seconds with agitation of the disc. The disc is then rinsed with water, and then dipped in concentrated aqueous nitric acid to remove the zinc coating previously applied. Then the zincating procedure is repeated to apply another layer of zinc which, in this instance, is allowed to remain.

After rinsing, the zincated disc is next copper plated by electroplating. The bath employed is a standard copper electroplating bath having the following composition:

| | | |
|---|---|---|
| Copper cyanide | oz./gal | 5.5 |
| Sodium cyanide | oz./gal | 6.6 |
| Sodium carbonate | oz./gal | 4.0 |
| Rochelle salts | oz./gal | 8.0 |
| pH | | 10.2–10.5 |
| Temperature, ° F. | | 130–140 |

Electroplating was carried out as follows: Electrical contact was made to the disc through the aluminum wire prior to placing it in the bath. For the first ½ minute the disc was plated at 10 amps./ft.$^2$ and for the next 4½ minutes the current was maintained at 5 amps./ft.$^2$. Then the disc was rinsed in cold running water for 30 seconds, then rinsed in hot water for 30 seconds and transferred immediately to the electroless cobalt bath.

The electroless cobalt bath had the following composition, all concentrations being in grams per liter of distilled water:

| | |
|---|---|
| Cobaltous chloride ($CoCl_2 \cdot 6H_2O$) | 15 |
| Trisodium citrate ($Na_3C_6H_5O_7 \cdot 2H_2O$) | 50 |
| 85% lactic acid ($CH_3 \cdot CHOH \cdot COOH$) | 50 |
| Disodium succinate ($Na_2C_4H_4O_4 \cdot 6H_2O$) | 32 |
| Sodium hypophosphite ($Na_2H_2PO_2 \cdot H_2O$) | 50 |

This bath was prepared as follows: The cobaltous chloride and trisodium citrate were dissolved in 250 ml. of distilled water. The disodium succinate and sodium hypophosphite were also dissolved, but separately in 250 ml. of distilled water. The solutions were mixed. The lactic acid was added and the mixture was made up to 800 ml. with distilled water and its pH was adusted with ammonia to 9.3. Then the solution was made up to 1 liter by the addition of distilled water.

The disc (which had been cleaned, zincated, and copper plated as described hereinabove) was immersed in this bath. This bath was maintained at approximately 200° F. and its pH was adjusted to about 9.1 to 9.3, as by addition of ammonia. The disc was immersed for about 8 minutes.

It is a known fact that, in the electroless deposition of cobalt in this manner, difficulty is sometimes encountered in starting the reaction, which is a reduction of cobaltous ion to metallic cobalt by the hypophosphite. Various means well known in the art can be employed to initiate the reaction. For example, if the reaction (which is manifested by the evolution of gas) is slow to start, a bare aluminum rod may be dipped in the solution, or other means well known in the art, may be resorted to. It is also a known fact that the electroless deposition of cobalt is an autocatalytic reaction so that, once it starts, no further difficulty is encountered.

In most instances of following the procedure described above, the reaction started quickly, and in those cases where it did not, it was started by touching the disc with a bare aluminum rod or by other known means.

In the practice of present invention the thicknesses of the three coating metals (zinc, copper and cobalt), may vary within fairly wide limits, e.g., from 0.0001 inch or less to 0.025 inch or more.

The zinc coating may be deposited by any suitable method, preferably by zincating.

The copper is preferably applied by electroplating. The cobalt coating should, however, be applied by electroless means. It appears that cobalt applied by other means such as electroplating does not produce the magnetically superior results which are desired.

It will be understood that, where a "cobalt" coating is referred to in the specification and in the appended claims, that the term "cobalt" embraces both metallic cobalt and cobalt phosphides, both of which are present in electroless cobalt coatings.

A procedure which has frequently been found helpful is to make an initial run with an electroless cobalt bath, then discard the cobalt coated specimen (which is often relatively inferior), then proceed with further electroless plating from the same bath. Subsequent specimens will usually be found to be much superior to the first, discarded specimen.

Magnetic memory devices made in this manner have outstanding qualities. For example, the cobalt coating is much harder and more abrasion resistant than the best of conventional iron oxide coatings applied with a lacquer, and, unlike such iron oxide coatings, it does not flake off. Flaking of iron oxide by friction with transducer heads impairs the magnetic qualities of the memory device and the flakes will short the heads. Unlike cobalt coatings applied by other methods, e.g., by electroplating, the cobalt coatings of the present invention are smooth and uniform.

It will, therefore, be apparent that a very superior magnetic memory device in the form of a disc or drum has been provided.

What is claimed is:

1. A magnetic memory device comprising a substrate of nonmagnetic material in a form adapted to be moved relatively to a magnetic transducer whereby said transducer sweeps out a continuous, nonrepetitive path of substantial length on the surface of the device, said substrate being coated by an adherent layer of zinc, said zinc layer being coated by an adherent layer of copper and said copper layer being coated by an adherent layer of electrolessly deposited cobalt.

2. The device of claim 1 wherein said substrate is aluminum.

3. The device of claim 2 in the form of a disc.

4. The device of claim 2 in the form of a cylinder.

5. A method of producing a cobalt-coated article which is suited for use as a magnetic memory device, said method comprising providing a nonmagnetic substrate, applying to the substrate a thin, adherent layer of zinc, applying to the layer of zinc a thin adherent layer of copper and applying to the layer of copper a thin, adherent layer of cobalt by deposition from an electroless cobalt bath.

6. The method of claim 5 wherein said substrate is a nonmagnetic metal.

7. The method of claim 6 wherein said metal is aluminum.

References Cited by the Examiner

UNITED STATES PATENTS

| | | | |
|---|---|---|---|
| 2,513,365 | 7/50 | Rogoff | 29—197 |
| 2,532,284 | 12/50 | Brenner | 117—130 |
| 3,055,717 | 9/62 | Schmidt | 29—197 |

DAVID L. RECK, *Primary Examiner.*

HYLAND BIZOT, *Examiner.*